(12) United States Patent
Cao et al.

(10) Patent No.: US 9,390,194 B2
(45) Date of Patent: Jul. 12, 2016

(54) MULTI-FACETED VISUALIZATION OF RICH TEXT CORPORA

(75) Inventors: Nan Cao, Xi'An (CN); David H. Gotz, Purdys, NY (US); Jimeng Sun, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 12/872,794

(22) Filed: Aug. 31, 2010

(65) Prior Publication Data

US 2012/0054226 A1  Mar. 1, 2012

(51) Int. Cl.
  *G06F 17/30* (2006.01)
(52) U.S. Cl.
  CPC .... *G06F 17/30941* (2013.01); *G06F 17/30716* (2013.01)
(58) Field of Classification Search
  CPC .................................................. G06F 17/30716
  USPC ......................................................... 707/769
  See application file for complete search history.

(56) References Cited

U.S. PATENT DOCUMENTS

| 2004/0133562 A1* | 7/2004 | Toong et al. ...................... 707/3 |
| 2010/0063973 A1* | 3/2010 | Cao et al. ...................... 707/758 |

OTHER PUBLICATIONS

Herman et al., "Graph Visualization and Navigation in Information Visualization: A Survey", IEEE Transactions on Visualization and Computer Graphics, 6(1):24-43 (2000).

van Ham et al., "Mapping text with phrase nets", IEEE transactions on visualization and computer graphics, 15(6):1169 (2009), Oct. 11, 2009.
U.S. Appl. No. 12/917,469 entitled "Method and System for Visualization of Data Set", filed Nov. 1, 2010.
Lin et al., "ContexTour: Contextual Contour Visual Analysis on Dynamic Multi-Relational Clustering", In SIAM Data Mining Conference (accepted), pp. 1-3, 7,8 Apr. 29-May 1, 2010.

* cited by examiner

*Primary Examiner* — Thu-Nguyet Le
(74) *Attorney, Agent, or Firm* — Ryan, Mason & Lewis, LLP

(57) ABSTRACT

Methods and apparatus are provided for multi-faceted visualization of rich text corpora. A data set comprising a plurality of entities, facets and relations is visualized by generating a visualization of a plurality of the facets in the data set, wherein the visualization indicates connections along the plurality of the facets in a single view using multi-faceted edges. The entities are instances of a particular concept, the facets are classes of entities and the relations are connections between pairs of the entities. A compound node comprises a representation of a primary entity, surrounded by representations of one or more secondary entities connected by one or more external relations. The internal relations can be represented as edges connecting two facet nodes from different compound nodes and a number of crossings of the edges can be reduced by adjusting a position order of facet nodes. The compound nodes can optionally be rotated based on, for example, a global spring force model to reduce an average length of one or more of the edges and/or to allow edge bundling.

18 Claims, 10 Drawing Sheets

MULTI-FACETED VISUALIZATION OF RICH TEXT CORPORA

FIELD OF THE INVENTION

The present invention relates generally to the electrical, electronic and computer arts, and, more particularly, to multi-faceted visualization techniques.

BACKGROUND OF THE INVENTION

As the Internet continues to experience explosive growth, an ever increasing amount of information is available through collections of rich text documents. Ranging from digital libraries to online medical references, these collections contain a wealth of multi-facet interconnected data. To navigate through this rich text data, most people now rely on search technologies to find relevant information. Search tools typically return a ranked list of documents whose content is highly related to a set of user-supplied keywords. This model has proven remarkably powerful for information retrieval tasks, such as locating the address of a restaurant.

Ranked lists, however, are insufficient for more complex data exploration and analytic tasks where users try to understand an overall document corpus or relationships between complex concepts that span across multiple documents. The effective organization and presentation of search retrieval results is still largely an open problem. This problem becomes even more challenging when considering the multi-facet nature of many documents. For instance, consider an online library of health-related articles such as Google Health. Each article in the library describes a specific disease and contains information about a number of different facets: symptom, treatment, cause, diagnosis, prognosis, and prevention. A search engine allows users to find a page describing a specific disease, and links allow users to navigate to a small set of predefined related pages. It remains difficult, however, to answer basic self-care questions. For example, a user may desire to identify the general classes of diseases leading to the symptoms that the user is experiencing, or to identify those diseases that have a similar prognosis.

These questions require an understanding of complex correlations across documents and across multiple facets of the contained information. To answer these questions, users need to examine both high-level overviews and fine-grained local-level relationships. For instance, a user in the above scenario would need to both explore clusters of related diseases and uncover pairwise relationships based on specific facets of information such as prognosis and treatment.

Information visualization technologies, when used in conjunction with data mining and text analysis tools, can be of great value for these sorts of tasks. For this reason, several visualizations have been designed for either high-level corpora summarizations or low-level structure analysis. Although many existing visualization techniques provide valuable insights into the visualized data, none of them offers a complete solution. In particular, existing visualization techniques do not provide: (1) interactive visualization of local data relationships within the context of global document patterns, (2) dynamic context control so that users can pivot between different facets of information, or (3) an integrated approach to multi-faceted search and visualization.

A need therefore exists for improved interactive visualization techniques that enable users to navigate and analyze large multi-faceted text corpora with complex cross-document relationships.

SUMMARY OF THE INVENTION

Generally, methods and apparatus are provided for multi-faceted visualization of rich text corpora. According to one aspect of the invention, a data set comprising a plurality of entities, facets and relations is visualized by generating a visualization of a plurality of the facets in the data set, wherein the visualization indicates connections along the plurality of the facets in a single view using multi-faceted edges.

The entities are instances of a particular concept, the facets are classes of entities and the relations are connections between pairs of the entities. Each facet can optionally be represented as a separate layer in a data model and is identified by a distinct pattern. A global relation can be indicated using a density map and a multi-faceted graph and a local relation can be indicated using one or more compound nodes. The relations comprise one or more internal relations that are connections between entities within a same facet and one or more external relations that are connections between entities of different facets.

A compound node comprises a representation of a primary entity, surrounded by representations of one or more secondary entities connected by one or more external relations. The internal relations can be represented as edges connecting two facet nodes from different compound nodes and a number of crossings of the edges can be reduced by adjusting a position order of facet nodes. The compound nodes can optionally be rotated, for example, based on a global spring force model, to reduce an average length of one or more of the edges and/or to allow edge bundling.

The visualization employs a visual encoding to distinguish the entities, facets and relations. For example, the visual encoding can distinguish one or more of the entities, facets and relations using one or more patterns and/or density maps. A co-occurrence pattern can be represented using parallel links between associated entities. One or more outlier patterns that represent entities with internal relations crossing cluster boundaries can be represented by highlighting links across the cluster boundaries using an opacity adjustment.

A disclosed user interface can receive a text query and providing a depiction in the visualization of one or more facets, entities, relations and clusters that are relevant to the query. The visualization optionally provides a dynamic context control to perform a context switch between different facets of information.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for multi-faceted visualization of rich text corpora. According to one aspect of the invention, the disclosed interactive visualization techniques enable users to navigate and analyze multi-faceted text corpora.

Data Model and Transformation

Figure 1:
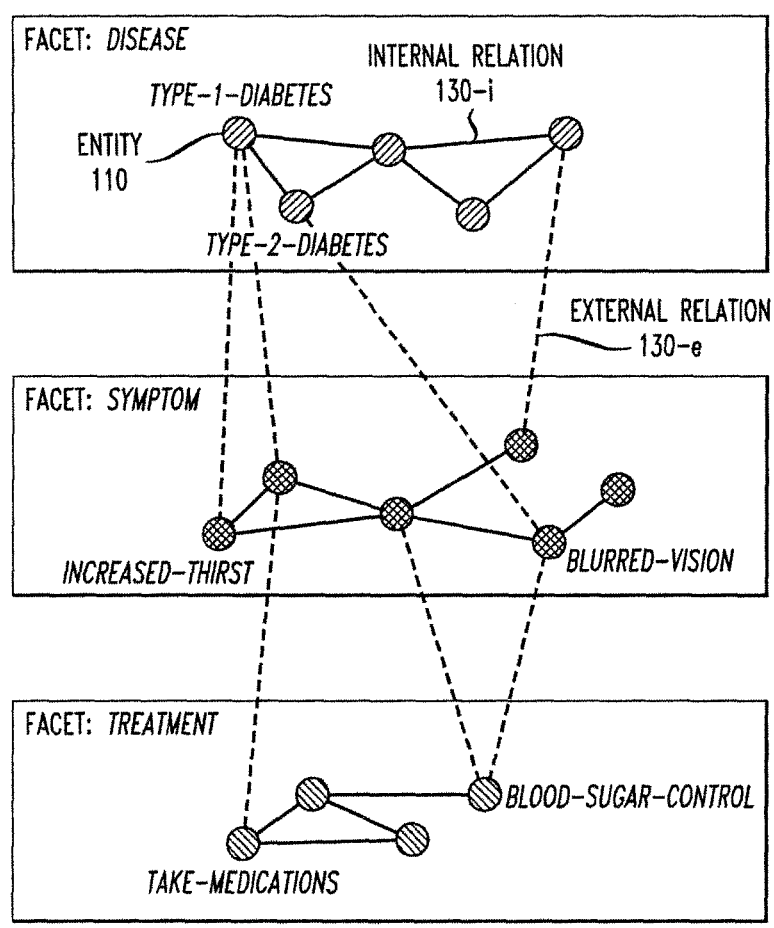
FIG. 1 illustrates an exemplary multi-facet entity-relational data model incorporating features of the present invention.

FIG. 1 illustrates an exemplary multi-facet entity-relational data model 100 incorporating features of the present invention. The data model 100 is a multi-faceted representation that captures entities and their relationships. As shown in FIG. 1, and discussed hereinafter, concepts in a complex text corpus are transformed into entities 110, facets 120 and relations 130. The facets 120, entities 110, and relations 130 are the abstract elements in the data model 100. As discussed further below in the section entitled "Visual Encoding," visual elements (e.g., point, link, area, and hash pattern) are employed to encode these abstract elements 110, 120, 130.

Entities 110 are instances of a particular concept from the data. For example, "Type-1-Diabetes" is a disease entity. Facets 120 are classes of entities 110. For example, "disease" is a facet which contains both the "Type-1-Diabetes" and "Type-2-Diabetes" entities 110. Relations 130 are connections between pairs of entities 110. There are two types of relations 130. Internal relations 130-*i* are connections between entities 110 or entity groups within the same facet. For example, "Type-1-Diabetes" has an internal relation 130-*i* to "Type-2-Diabetes" because both are diseases. External relations 130-*e* are connections between entities 110 of different facets 120. For example, the disease entity "Type-1-Diabetes" has several external relations 130-*e* to symptom entities, such as "increased thirst" and "blurred vision." Finally, clusters are groups of similar entities 110 within a single facet 120. For example, a group of diseases related to "Type-1-Diabetes" forms a cluster on the disease facet 120-1.

FIG. 1 illustrates three exemplary facets 120-1, through 120-3, namely, disease 120-1, symptom 120-2 and treatment 120-3. Each facet 120 is represented as a separate layer and each distinct hash pattern corresponds to a different facet 120-*i*. Nodes on each layer represent entities 110 within the corresponding facet 120. Edges within a layer are internal relations 130-*i*, while edges across layers are external relations 130-*e*.

Figure 2:
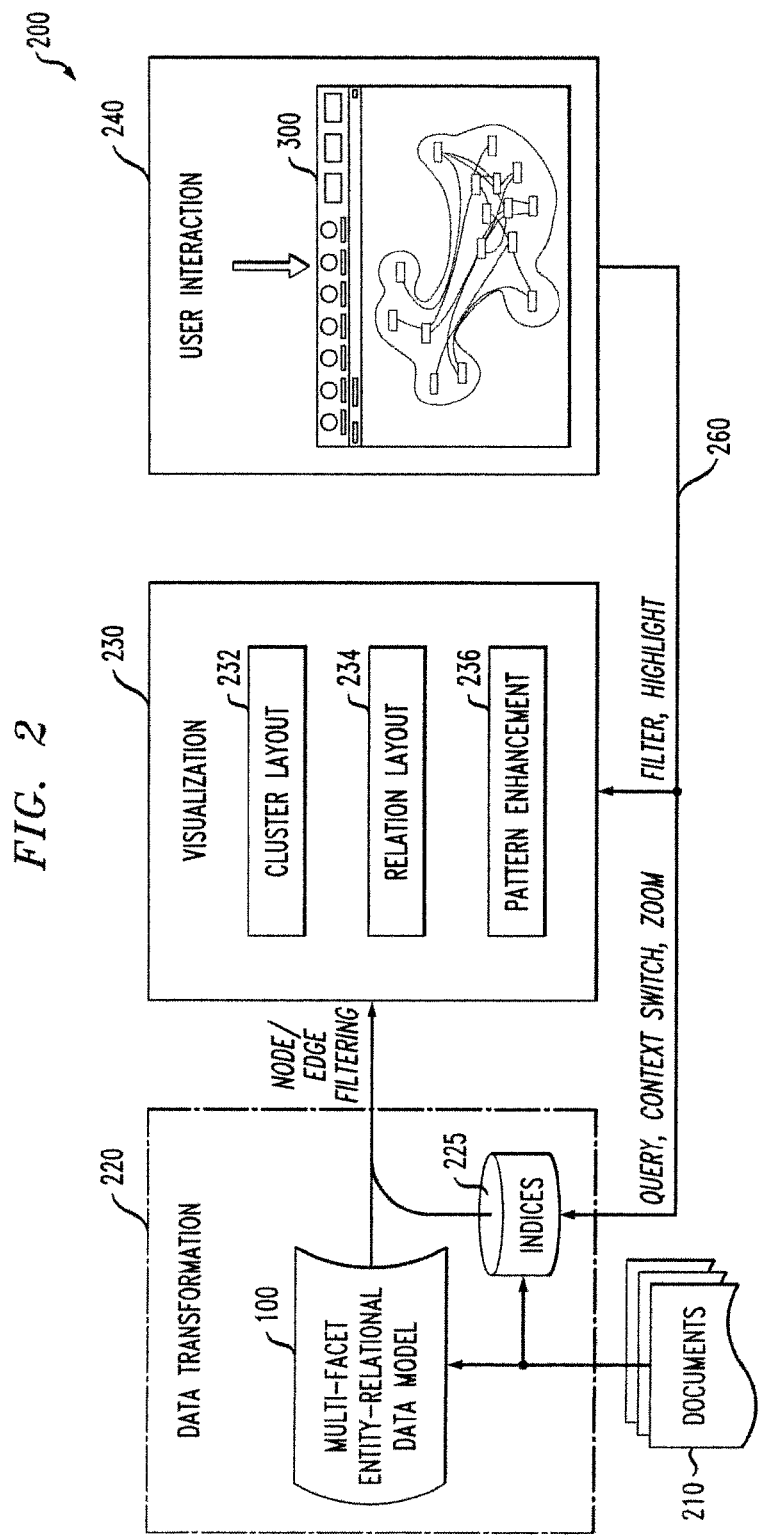
FIG. 2 illustrates an exemplary system architecture for a multi-faceted visualization system incorporating features of the present invention.

FIG. 2 illustrates an exemplary system architecture for a multi-faceted visualization system 200 incorporating features of the present invention. As shown in FIG. 2, a complex text corpus 210 comprising a plurality of documents are processed by the multi-faceted visualization system 200 to generate a visualization 300 of the multi-faceted information in the complex text corpus 210. Generally, the visualization 300 comprises an interactive visualization for the exploration and analysis of the multi-facet interconnected data in the corpus 210. As discussed hereinafter, the multi-faceted visualization system 200 initially performs a transformation 220 of the raw text material in the corpus 210 to fit into the multi-facet entity relational data model 100 of FIG. 1. Thereafter, the multi-faceted visualization system 200 performs a visualization 230 in accordance with the present invention.

As discussed herein, the disclosed multi-faceted visualization system 200 generates a multi-facet visualization for entity-relational text documents. The exemplary multi-faceted visualization system 200 visualizes both global and local relations of complex text document collections. In particular, global relations are displayed through the use of a density map and graph visualization; and local relations are conveyed through compound nodes and edge bundling techniques. The exemplary multi-faceted visualization system 200 also provides rich interactions such as filtering, visual pattern highlighting, and context switching. These interactions enable users to examine a text corpus from multiple perspectives.

Transformation 220

As indicated above, the raw text material in the corpus 210 may need to be transformed to fit into the multi-facet entity relational data model 100 of FIG. 1, prior to the visualization 230. The transformation process 220 comprises the following key steps: multi-facet entity extraction, similarity measurement, and index building.

First, the multi-facet entities are extracted by (i) applying a standard name entity recognition (NER) based on a domain-specific model such as the medical model, or (ii) relying on a topic modeling (e.g., ContexTour). The name entity recognition may be implemented, for example, using the Stanford Name Entity Recognizer, http://nlp.stanford.edu/software/CRF-NER.shtml. The NER can extract entities 110 in facets 120, such as organization, location and time. Topic modeling techniques analyze topic threads from documents that are used as facets 120 and their keywords are used as entities 110.

Second, a similarity graph is constructed for the extracted entities 110. In this step, information retrieval measures (e.g., cosine similarity) or topic-level similarity through topic modeling can be employed. This step may be skipped, for example, when topic information is available from the text corpus 210, such as in the case of Google Health.

The final transformation step comprises building separate search indices 225 for each facet 120. In one exemplary implementation, Lucene is used to build separate search indices 225 for each facet 120. (See, e.g., http://lucene.apache.org/java/docs/). These indices 225 are leveraged for online queries. As a result, user-supplied query keywords can be used at runtime to access targeted portions of the data model 100. The search index provides a list of documents and entities that match the query. When a query is issued, the most relevant entities and their corresponding relations are retrieved and visualized. A co-occurrence table can be constructed for the extracted keywords and used to dynamically build the data model 100.

Visualization 230

As shown in FIG. 2, the visualization process 230 comprises the steps of generating a cluster layout 232, generating a relation layout 234 and performing a pattern enhancement 236. These steps are performed in accordance with an overall visual design, discussed hereinafter.

Figure 3:
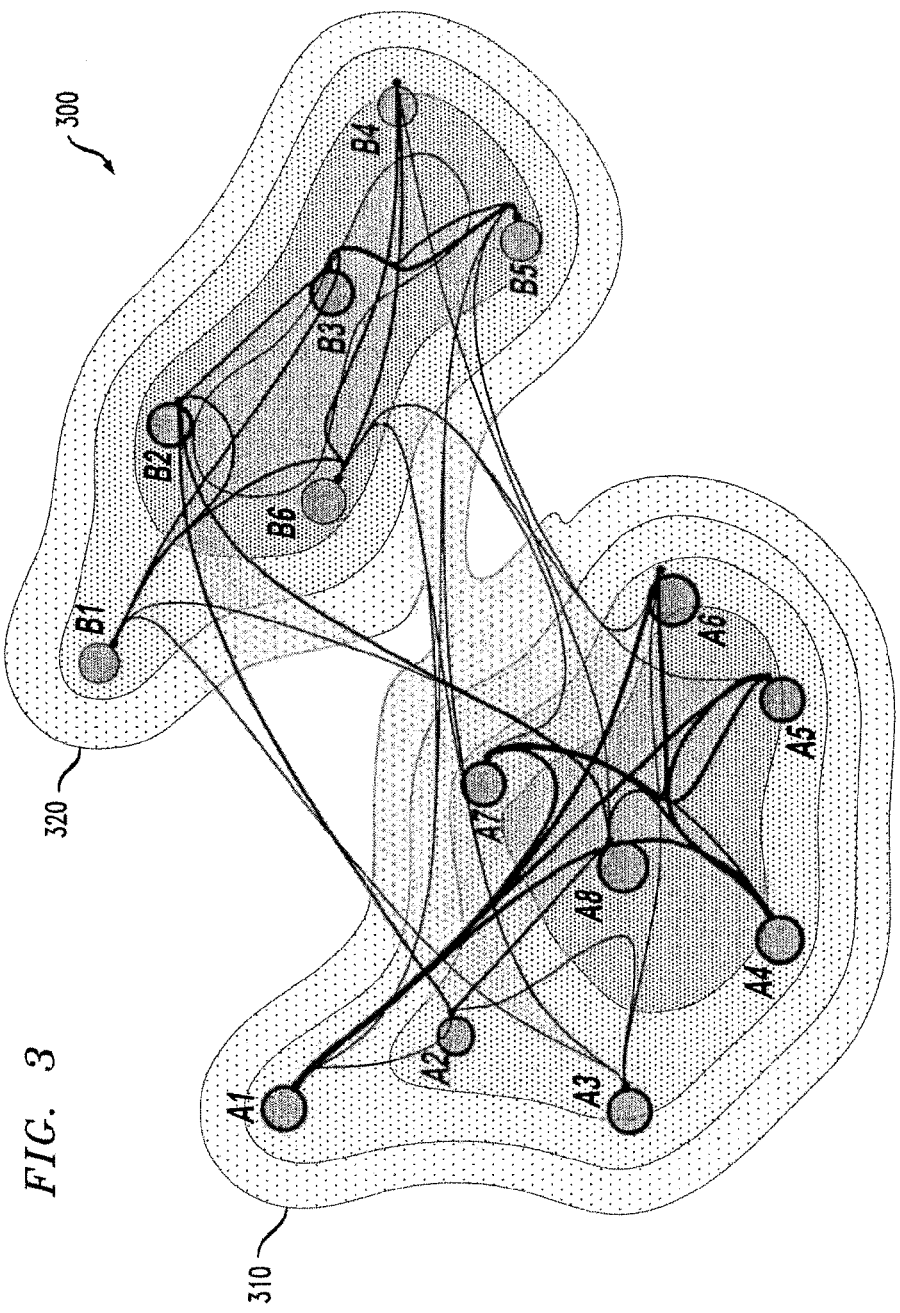
FIG. 3 illustrates an exemplary visualization of the multi-faceted information in the complex text corpus of FIG. 2.

To encode both global cluster information as well as detailed pairwise relationships in the multi-facet interconnected data, a density map is combined with a multi-faceted graph. FIG. 3 illustrates an exemplary visualization 300 of the multi-faceted information in the complex text corpus 210. As shown in FIG. 3 and discussed further below, the cluster context is displayed as a density map 310, 320 in the background layer. In the multi-faceted graph 300, entities 110 are represented by circles, hash-coded by their facets 120 (i.e., each distinct hash pattern corresponds to a different facet). The display map 310 portrays a global context. The facets A1-A8 correspond to a first cluster 310 and the facets B1-B6 correspond to a second cluster 320.

Additional aspects of the multi-faceted visualization system 200 are discussed further below including: (1) the exemplary visual encoding adopted to represent elements of the data model 100 in the visualization 300, (2) the exemplary visual patterns employed to facilitate data exploration; and (3) the exemplary user interactions that allow users to examine data from multiple perspectives.

A. Visual Encoding

Figure 4:
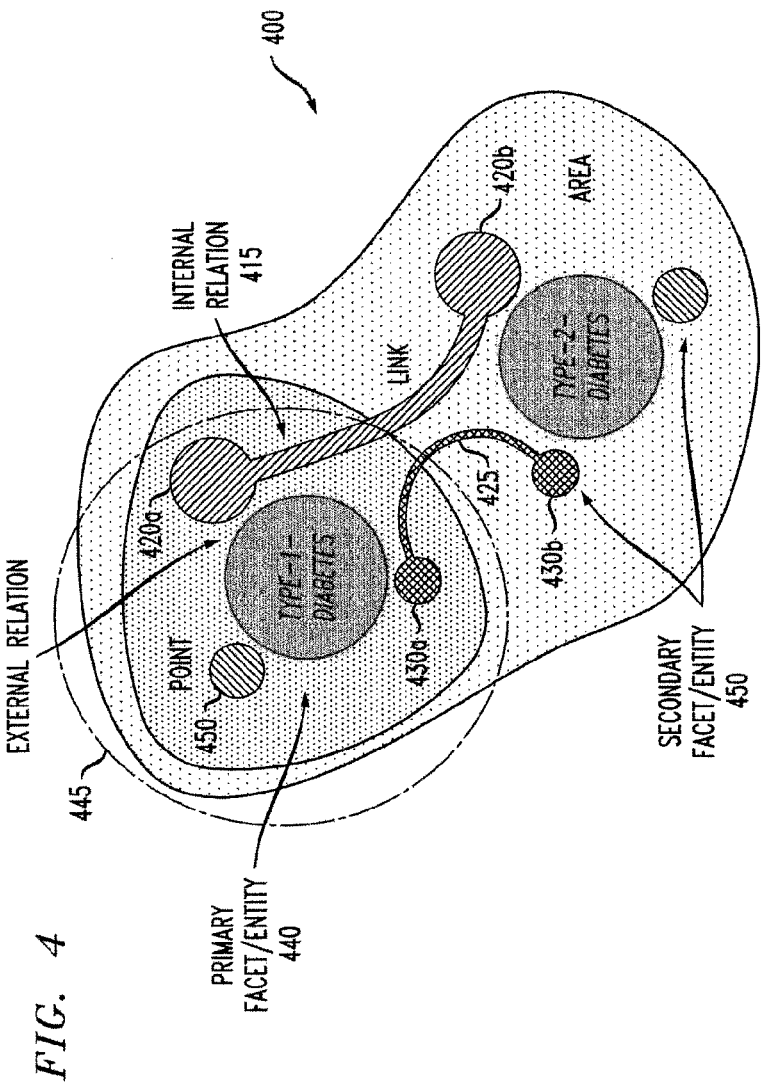
FIG. 4 illustrates an exemplary visual encoding of the data model of FIG. 1 in accordance with the present invention, using an exemplary spatial arrangement of coded nodes and edges.

As previously indicated, the facets 120, entities 110, and relations 130 are the abstract elements in the data model 100. Visual elements (e.g., point, link, area, and hash pattern) are employed to encode these abstract elements 110, 120, 130. FIG. 4 illustrates an exemplary visual encoding 400 of the data model 100 of FIG. 1 in accordance with the present invention, using an exemplary spatial arrangement of coded nodes and edges.

i. Facet Encoding

As previously indicated, facets 120 are encoded using different hash patterns. Categorical hash patterns are selected for each facet 120, so that facets 120 can be easily differentiated. The facet hash patterns can be consistently used for both points and links, and the hash patterns remain constant across views as users navigate the visualization 300. In addition, the visualization 300 differentiates between a single primary facet 120 and other secondary facets 120 by sizes and hash patterns. In an exemplary embodiment, an interactive facet legend can optionally display the primary facet as the leftmost and largest circle and uses entities 110 from this facet 120 to build the base graph of the visualization 300.

ii. Entity Encoding

An entity 110 is represented as circles hash patterned by its facet. For a primary entity (entities 110 that belong to the primary facet), circle size is used to represent an entity's degree-of-interest (DOI). See, e.g., J. Thomas and M. Schneider, Human Factors in Computer Systems (1984; Ablex Pub.). More specifically, DOI determines to what extent a user will be interested in a certain entity 110. In a search-oriented application area, users' interests become clear when they issue a query. Therefore, DOI is defined as the relevancy of an entity 110 to a user's query.

Secondary entities 450 (entities 110 that belong to one of the secondary facets) are rendered together with primary entities 440 as compound nodes 445. Each compound node 445 contains a single large circle representing a primary entity 440, surrounded by small nodes representing secondary entities 450 invisibly connected by external relations 130-e. These nodes are referred to as entity nodes and facet nodes, respectively. For example, in FIG. 4, the disease "Diabetes-Type-1" has a symptom facet node 420a, 420b that corresponds to a set of symptom entities (using the hash pattern for the symptom facet) such as "increased-thirst" and "blurred-vision" that have external relations to the disease.

In one exemplary implementation, multiple secondary entities can be collapsed into a single facet node to reduce visual clutter. As a result, the visualization 300 becomes more consistent since only primary entities are displayed in detail. This simplification enables the successful display of both global and local patterns in a clear fashion.

iii. Relation Encoding

Two different visual encodings are used to encode relations 130 within the multi-faceted visualization system 200, one for each of the two relation types: internal relations 130-i and external relations 130-e.

Internal relations 130-i are encoded using links between corresponding facet nodes 440, 450 of two different compound nodes 445. Once again, a corresponding hash pattern is used to illustrate the facet represented by the link. For example, FIG. 4 shows a link 415 representing an internal relation 130-i between the symptom nodes 420a, 420b of two different diseases. The thickness of a link, such as lnk 415, indicates how related two entities are along a specific facet 120. In FIG. 4, "Type-1-Diabetes" and "Type-2-Diabetes" share a lot of common symptoms 420a, 420b, but fewer common treatments 430a, 430b. Note that symptoms correspond to facet 120-2 and treatments correspond to facet 120-3 in the exemplary data model 100. Therefore, the link 415 is thicker than the link 425.

Based on this encoding, the links 415, 425 between two compound nodes A and B (such as compound node 445) indicate the overall similarity of their primary nodes 440 in multiple facets 120. More specifically, the thickness of a single link in Facet F that connects two facet nodes respectively in A and B is encoded to the similarity of A' primary entity and B' primary entity in F. This similarity is calculated by the overlap ratio of the secondary entities inside two connected facet nodes. For example, A's primary entity is "diabetes" and B's primary entity is "cancer". If there is an internal link 130-i on the symptoms facet that connects A and B, it indicates that "diabetes" and "cancer" has some similar symptoms. The number of the symptoms in common over all their symptoms is the overlap ratio that indicates the similarity of these two diseases on the symptom facet. It is encoded by the thickness of the linkage.

External relations 130-e are encoded implicitly through the construction of compound nodes. When a primary entity 440 is displayed through a compound node 445, only facet nodes 120 with external relations 130-e to the primary entity 440 are included. Moreover, the size of a facet node 120 is proportional to the number of external relations on that facet. For example, FIG. 4 shows three facet nodes for "Diabetes Type-1." Among the three, the symptom node 420a is the largest, signifying the most external relations 130-e between "Diabetes type-1" and different symptoms.

B. Visual Patterns

To help users reason about multi-facet interconnected data, the exemplary multi-faceted visualization system 200 provides several visual patterns to facilitate user exploration.

i. Clusters

As discussed above in conjunction with FIG. 3, groups of similar entities are represented using an optimized density map. Intuitively, a clustering process divides entities 110 into groups by their internal relations 130-i. A more detailed description of the algorithm is discussed further below in the section entitled "Kernel Density Estimation," as well as in Y.-R. Lin et al., "Contextour: Contextual Contour Visual Analysis on Dynamic Multi-Relational Clustering," SIAM Data Mining Conf., (April 2010), incorporated by reference herein. Visually, areas with boundaries are used to encode the calculated clusters. When visualizing large text corpora with too many entities to display at once, only the entities with highest DOI in each cluster will be shown on the screen. To provide navigation queues regarding hidden entities, a cluster density metric can be computed and mapped to the hash pattern intensity of the bounded areas. This conveys the overall distribution of entities within the clusters.

ii. Co-Occurrences

Co-occurrence patterns occur when two or more entities 110 have very strong internal relations 130-$i$ across several facets. Such a set of nodes often implies a tight cluster on secondary facets 450. For example, if a set of diseases share the same symptoms, treatments and prognoses, the relations across these facets 120 will form a co-occurrence pattern. This pattern signifies that the set of diseases are deeply related. Visually, co-occurrence patterns can be represented across multiple facets 120 as using parallel links between the associated entities. For example, strongly correlated symptoms can be represented using parallel links connecting the correlated facets.

iii. Outliers

Outlier patterns represent entities with internal relations that cross cluster boundaries. Visually, outlier patterns can be represented by highlighting links across the cluster boundaries via opacity adjustment, as discussed further below in the section entitled "Pattern Enhancement."

C. User Interaction

To support interactive exploration of the visualized data, the exemplary multi-faceted visualization system 200 provides several rich interactions. In one implementation, an exemplary user interface of the multi-faceted visualization system 200 provides an interactive facet legend, a query box, a canvas for rendering multifaceted relational diagrams, and a dynamic query filter to control the amount of information being displayed.

i. Dynamic Query

The exemplary multi-faceted visualization system 200 allows users to provide a text query through a multi-facet query box. In response to a search, the main visualization space provides a depiction of the facets, entities, relations and clusters relevant to the query. In addition, users can use a dynamic query filter slider to filter entities based on their DOIs. During the dynamic query process, animated transitions as well as a context-preserving layout algorithm (See, e.g., N. Cao et al., "Interactive Poster: Context-Preserving Dynamic Graph Visualization," IEEE Symposium on Information Visualization (2008)) can be applied to maintain a user's mental map. This approach balances layout stability against overall readability to provide an optimized dynamic visualization experience with minimum changes and maximum aesthetics.

ii. Semantic Zoom

A semantic zoom feature allows users to select a particular compound node to zoom in for more details about related entity nodes. Similar to dynamic queries, the exemplary multi-faceted visualization system 200 uses animated transitions and context-preserving layouts to maintain a user's mental map during semantic zoom.

iii. Context Switching

Users perform a context switch to change the "primary facet" around a focal point. As an extension of semantic zoom, context switching allows users to focus on a specific compound node 445 then switch view point to another facet. For example, if a user switches context from a disease facet view to a symptom facet view, all related symptoms will be shown as entity nodes in the resulting visualization. Diseases, meanwhile, collapse into facet nodes surrounding the symptom nodes. An exemplary process 900 for performing a dynamic context switch is discussed further below in conjunction with FIG. 9. Generally, the dynamic context switch process 900 allows users to pivot the primary visualization layout arrangement across different facets 120 while maintaining his or her analytic focus.

iv. Highlight

Two types of highlighting interactions are supported by the exemplary multi-faceted visualization system 200: link highlights and pattern highlights. Link highlights provide contextual information for an entity. More specifically, when a mouse-over occurs over a compound node x, the tooltip with a summary of x is shown. In addition, all other entity nodes that are directly connected to x are also highlighted.

Pattern highlights are designed to help filter out trivial connections and enhance more meaningful patterns such as outliers and co-occurrences. For example, users can select a radio button on a user interface to control the pattern highlighting feature.

v. Other Interactions

In addition to the interactions described above, several standard interactions can also be provided by the exemplary multi-faceted visualization system 200.

Power Buttons. These buttons allow users to turn on/off certain facets. In one exemplary implementation, a legend bar can be provided on top of the main view showing hash pattern-coded facet buttons. The leftmost and largest button can show the primary facet, followed by smaller secondary facet buttons. The secondary facet buttons can be clicked to turn on/off the corresponding facet and its relations.

Links To Documents. At any given time, users can connect back to the original documents by double clicking on the nodes and links. A popup window can be shown to illustrate the summarization of the contents. The multi-faceted visualization system 200 can generate summarization in the following ways.

First, for the entities that have corresponding documents such as the entities in a disease facet, the list of such documents can be returned. If only a single such document exists, a direct connection to this document can be provided.

Second, for the entities that occur in multiple documents such as the symptoms entities, a portable multi-document summarization system, such as MEAD (see, http://www-.summarization.com/mead/) can be used to summarize the related documents into a temporary text file that contains both the content summarization of the original documents and the hyperlinks pointing to them, in a similar manner to the search results generated by a traditional search engine, such as Google™.

Multi-Faceted Visualization System Implementation

As discussed above in conjunction with FIG. 2, the exemplary multi-faceted visualization system 200 comprises a data transformation module 220, a visualization rendering module 230 and a user interaction module 240. The transformation module 220 transforms a collection of text documents in the corpus 210 to fit into the multi-facet entity relational data model 100 of FIG. 1, through text mining and entity extraction. The transformation process 220 also constructs a set of indices 225 over the data model 100 for online querying.

The visualization module 230 maps the indexed entities and relations to a multi-faceted visual display 300 according to the exemplary visual design. The visualization module 230 employs custom algorithms for laying out clusters of nodes and relationships between those nodes. The visualization module 230 also includes pattern enhancement capabilities that improve the overall appearance and legibility of the visualization.

The user interaction module 240 enables interactions for users to explore the data through operations such as filter, query and context switch. These operations feed back along a path 260 into the data transformation module 220 and visualization module 230 to enable user-driven data exploration.

A. Cluster Layout

Cluster layout 232 is performed within the visualization module 230. In the exemplary embodiment, the clustering is implemented in accordance with the teachings of Y.-R. Lin et al., "Contextour: Contextual Contour Visual Analysis on Dynamic Multi-Relational Clustering," SIAM Data Mining Conf., (April 2010), incorporated by reference herein. Given a set of entities retrieved from an online query, a density-map is rendered 310, 320 in the background to depict the overall distribution of matching entities. Unfortunately, it is impossible to know the real distribution of the data. Therefore, the density map 310, 320 is rendered by first preforming a Kernel Density Estimation. The Kernel Density Estimation process finds the optimized smooth kernel density estimator to simulate entity distributions over the entire dataset. After that, these samples are laid out within the display space. Then, the optimized estimator is placed over all samples and joint distributions are computed for intermediate locations within the space. Finally, the contours are traced within the estimated values to generate a density map with contour lines at multiple levels.

i. Kernel Density Estimation

Kernel density estimation (KDE) is a non-parametric way of estimating the probability density function of a random variable. To approximate and visually illustrate the global cluster context in multi-faceted interconnected data, the underlying entities are used to model the density distribution. To learn an optimal KDE, the traditional KDE technique are extended to determine the density distribution around entities. More specifically, to well represent all the interconnected nodes by the sampled nodes, each of the hidden nodes is assigned to one of the closest sample nodes by performing a reverse-kNN search based on graph topology. Mathematically, given a kernel function K(.) and a positive number h as its bandwidth, the n-sample kernel density estimator on the k-th facet is defined as:

$$f_n^k(v) = \frac{1}{n} \sum_{i=1, i \neq v}^{n} \frac{m_i}{h} K\left(\frac{d_{iv}}{h}\right) \quad (1)$$

where $v \in V$ is an entity in the raw data; $d_{iv}$ is the length of the shortest path between the entity v and the sample entity i on facet k; and $m_i$ is the kernel mass of the i-th sample. The bandwidth h controls the amount of smoothing. When h is small, $f_n(x)$ gives a set of spikes. When h is large, $f_n(x)$ becomes a uniform distribution. To find the best estimator that is closest to the real distribution, the following loss function between the unknown real distribution f(x) and its n-sample estimator $f_n(x)$ is minimized by choosing an optimal bandwidth h*:

$$L(h) = \int (f(v) - f_n(v))^2 dv \quad (2)$$
$$= \int f_n(v)^2 dv - 2 \int f_n(v) f(v) dv + \int f(v)^2 dv$$

Considering that $\int f(x)^2 dx$ is not dependent on h, Eq. (2) can be reformulated as follows:

$$J(h) = \int f_n(v)^2 dv - 2 \int f_n(v) f(v) dv \quad (3)$$

Empirically, this can be trained using leave-one-out cross-validation (see, e.g., B. Turlach, "Bandwidth Selection in Kernel Density Estimation: A Review," CORE and Institut de Statistique, 23-493, 1993) over the training samples. Thus, a smooth mass is effectively placed over all data points through the best n-sample estimator.

ii. Density Map Layout and Estimation

The density map is generated based on the sample node locations within the display space, and the optimized density estimator is used to simulate entity distribution of the entire data corpus.

A base layout is first computed by mapping samples to the display space.

To stabilize the layout of visible nodes during animated transitions, a context preserving stress majorization algorithm (See, e.g., N. Cao et al., referenced above) can be used. The exemplary algorithm balances between the readability and stability of the density diagram by taking the dynamics of data exploration into account. Furthermore, layout relationships are preserved between individually connected components by adding virtual connections among the most related nodes in different components respectively. The relatedness is computed using internal relations on the secondary facets.

After the base layout is obtained, the optimized density estimator is applied over all the samples. Joint distributions are computed in real-time according to the sample locations. Contour lines of the density map 310, 320 are then generated by tracing the gradient of the joint densities across the display space. To accelerate the density map generation, the screen is divided into a low resolution density matrix. Finally, the estimated density values are used to determine the hash pattern transparency of areas in the density map to complete this portion of the visualization.

For a more detailed discussion of the generation of the cluster layout, see Chinese Patent Application No. 200910211313.0, entitled "Method and System for Visualization of Data Set,", incorporated by reference herein.

B. Relation Layout

The exemplary multi-faceted visualization system 200 implements two types of linkage layouts to represent both internal relations 130-i and external relations 130-e among facets 120 simultaneously. As noted above in the section entitled "Visual Encoding," external relations 130-e are represented with facet nodes 120 by placing them around a central entity node. This arrangement forms a single compound node 445. Internal linkages 130-i are represented as edges that connect two facet nodes 120 from different compound nodes 445. According to an aspect of the invention, to reduce line crossings and facilitate relational pattern search, a custom layout algorithm is used to arrange the visual presentation of these elements.

Figure 5:
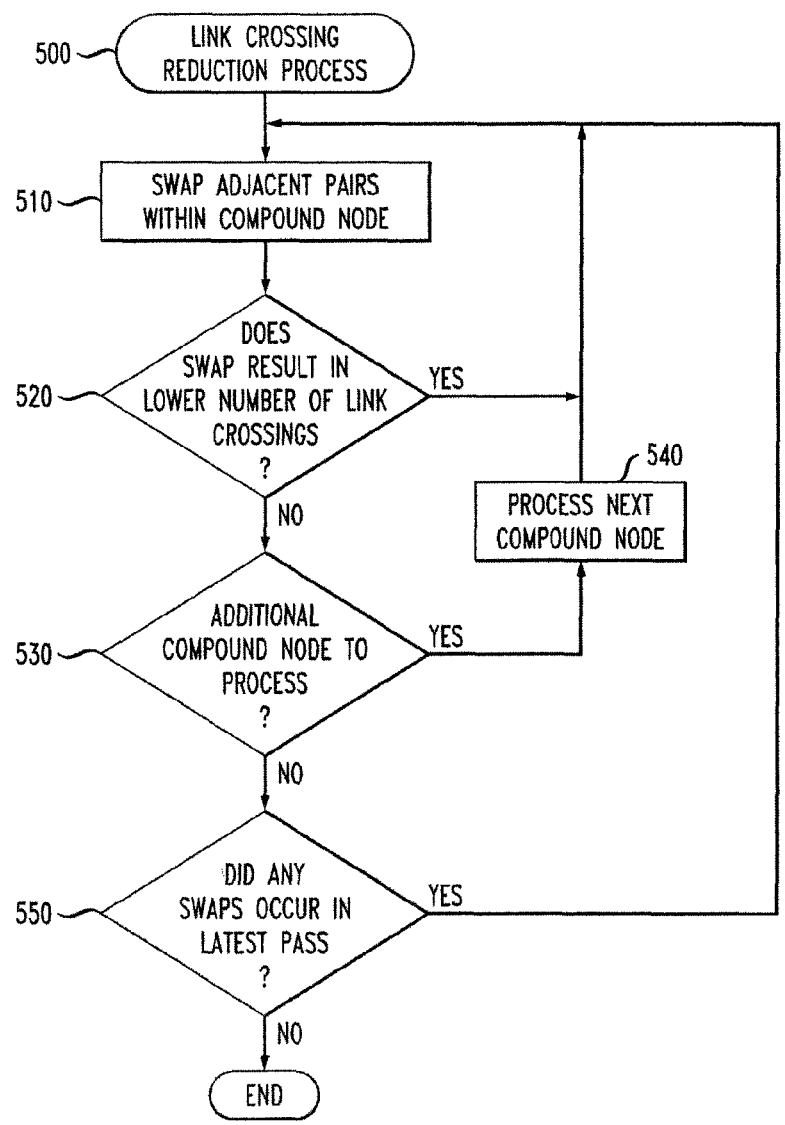
FIG. 5 is a flow chart describing an exemplary implementation of a link crossing reduction process incorporating features of the present invention.

FIG. 5 is a flow chart describing an exemplary implementation of a link crossing reduction process 500 incorporating features of the present invention. Generally, the link crossing reduction process 500 reduces line crossings by adjusting the position order of facet nodes. The exemplary link crossing reduction process 500 repeatedly swaps adjacent pairs of facet nodes within each compound node, for as long as the swaps result in a lower number of crossings. The link crossing reduction process 500 is repeated until it reaches a pass with no swaps.

As shown in FIG. 5, the exemplary link crossing reduction process 500 initially swaps adjacent pairs of facet nodes within a given compound node during step 510. Thereafter, a test is performed during step 520 to determine if the swap resulted in a lower number of link crossings. If it is determined during step 520 that the swap resulted in a lower number of link crossings, then the process returns to step 510 to make additional swaps.

If, however, it is determined during step 520 that the swap did not result n a lower number of link crossings, then program control proceeds to step 530 to determine if there are any additional compound nodes to process. If it is determined during step 530 that there are additional compound nodes to process, then the next compound node is processed during step 540.

A test is performed during step 550 to determine if any swaps occurred in the latest pass. If it is determined during step 550 that at least one swap occurred in the latest pass, then program control returns to step 510 to continue making swaps. If, however, it is determined during step 550 that no swaps occurred in the latest pass, then program control terminates.

Figure 6:
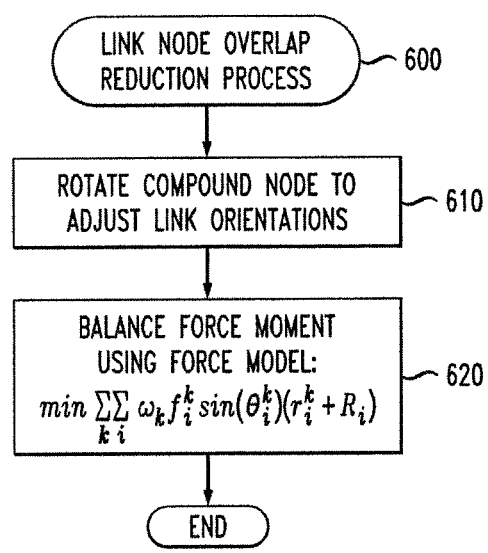
FIG. 6 is a flow chart describing an exemplary implementation of a link node overlap reduction process incorporating features of the present invention.

FIG. 6 is a flow chart describing an exemplary implementation of a link node overlap reduction process 600 incorporating features of the present invention. The link node overlap reduction process 600 processes the refined order generated by the link crossing reduction process 500 of FIG. 5. Generally, the link node overlap reduction process 600 rotates the compound node to adjust link orientations. The exemplary link node overlap reduction process 600 applies, for example, a global spring force model across all compound nodes to (1) minimize the average edge length, and (2) refine compound node orientations to facilitate edge bundling.

As shown in FIG. 6, the exemplary link node overlap reduction process 600 initially rotates the compound node to adjust link orientations during step 610. Thereafter, the link node overlap reduction process 600 balances the force moment during step 620 using a force model, as follows:

$$\min \sum_k \sum_i \omega_k f_i^k \sin(\theta_i^k)(r_i^k + R_i) \quad (4)$$

where $\omega_k$ is the importance of the k-th facet, i is the index of the entity node. $R_i$, $r_i^k$ are radii of the i-th entity node and its k-th facet node, respectively. $\theta_i^k$ is the orientation of the edge with an endpoint of the k-th facet node of the i-th entity node. The new objective balances the force moment on each compound node. Thus, it avoids unnecessary link-node overlapping. The spring force is applied to each internal linkage.

Figure 7A:
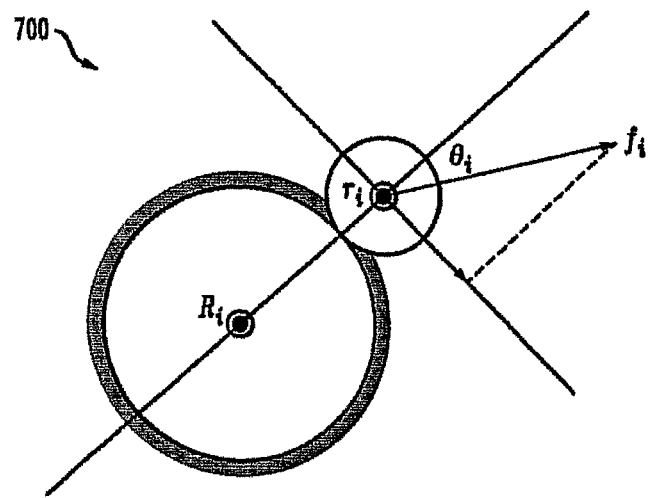
FIGS. 7A through 7C illustrate the force model and rotation that are applied to the compound nodes by the link node overlap reduction process of FIG. 6.
Figure 7B:
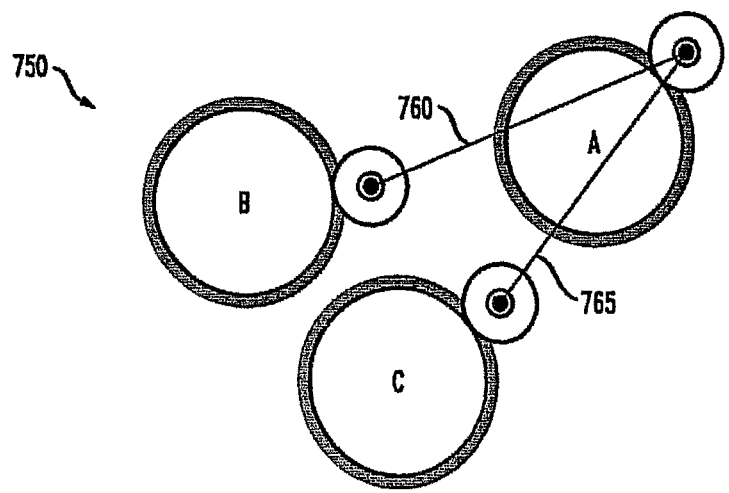

FIGS. 7A and 7B illustrate the force model that is applied to the compound nodes by the link node overlap reduction process 600. FIG. 7A illustrates the force momentum resolution 700 of a single spring force, $f_i$, in the force model. FIG. 7B illustrates an exemplary overlap 750 of two links 760, 765 associated with internal relations between secondary facets. The two internal links 760, 765 overlap with entity node A in a poor layout of the facet nodes.

Figure 7C:
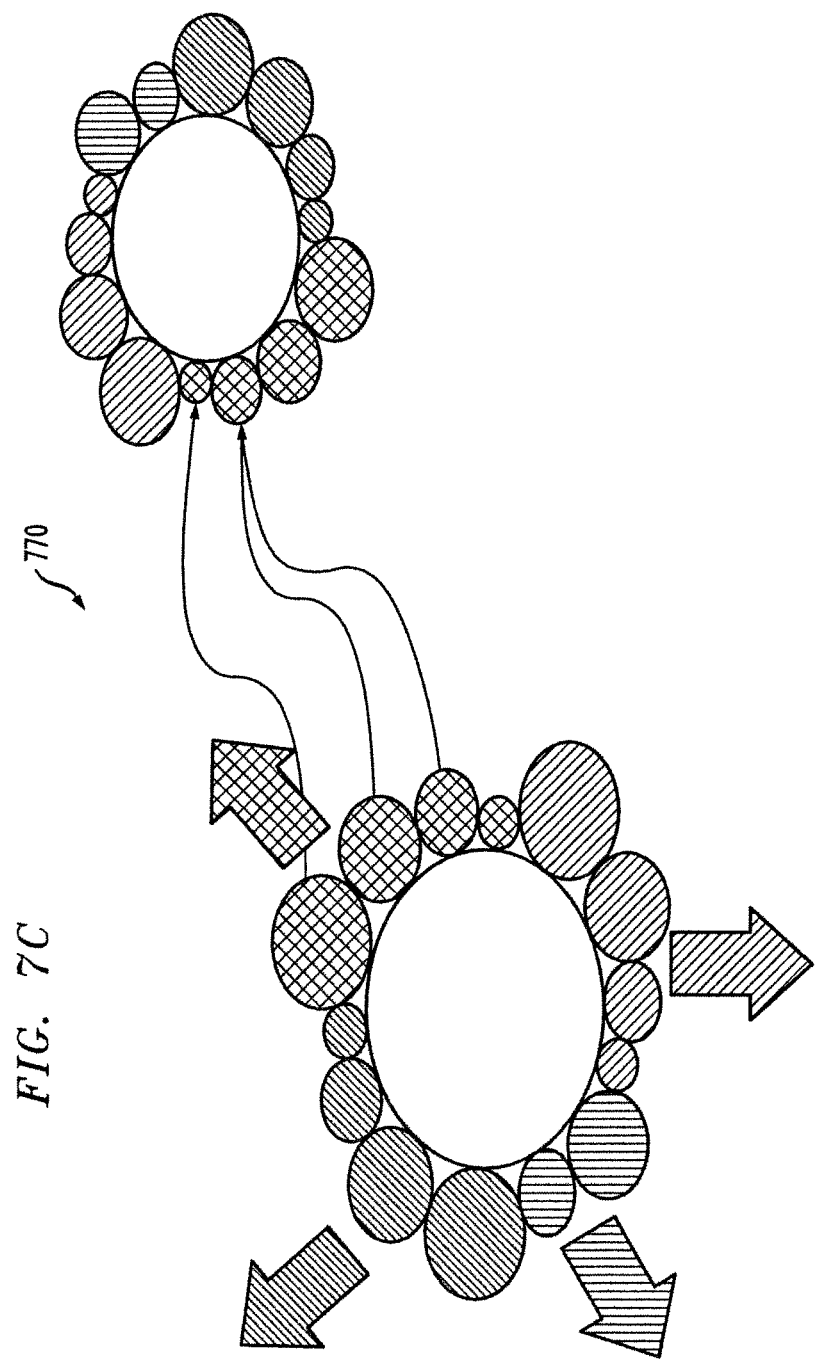

FIG. 7C illustates the rotation 770 performed by the link node overlap reduction process 600 to balance the forces and thereby shorten the links.

A graph partitioning process can be applied to the layout generated by the link node overlap reduction process 600. The graph partitioning process divides the clusters before applying a hierarchical edge bundling to bundle linkages through the center of the each cluster containing their end points. See, for example, D. Holten, "Hierarchical Edge Bundles: Visualization of Adjacency Relations in Hierarchical Data," IEEE Trans. on Visualization and Computer Graphics, 12(5):741-748 (2006), incorporated by reference herein.

C. Pattern Enhancement

As noted above in the section entitled "Visual Patterns," the exemplary multi-faceted visualization system 200 can automatically detect two detailed linkage patterns: outlier patterns and co-occurrence patterns. In a complex text corpus, identifying these patterns is challenging. Filtering alone does not help because such patterns can only be found when all connections are shown. Therefore, the exemplary multi-faceted visualization system 200 optionally applies an automated algorithm to adjust linkage hash pattern opacities to enhance outlier patterns and co-occurrence patterns. For example, strongly correlated symptoms can be visualized using parallel links connecting the correlated facets.

Figure 8:
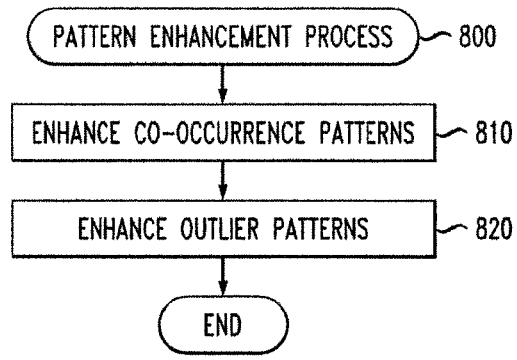
FIG. 8 is a flow chart describing an exemplary implementation of a pattern enhancement process incorporating features of the present invention.

FIG. 8 is a flow chart describing an exemplary implementation of a pattern enhancement process 800 incorporating features of the present invention. As shown in FIG. 8, the exemplary pattern enhancement process 800 enhances co-occurrence patters during step 810 and enhances outlier patterns during step 820.

The exemplary adjustment of hash pattern opacities is based on two similarity measurements: semantic similarity and layout closeness. The exemplary pattern enhancement process 800 enhances co-occurrence patterns during step 810 using the semantic similarity $sim_{ij}$ between any pair of entity nodes i and j. The semantic similarity $sim_{ij}$ is calculated by considering all internal connections of these two nodes, as follows:

$$sim_{ij} = \sum_{k=1}^{M} sim_k(i, j) \quad (5)$$

where $sim_k(i,j)$ computes the similarity between entity nodes i and j on facet k; and M is the number of facets. In an exemplary implementation, the similarity is calculated by summing the weights of the corresponding internal connections.

Layout closeness $d_{ij}$ between two entity nodes i and j measures how close the two nodes are in the layout. In an exemplary implementation, a hierarchical clustering metric is applied. In this metric, the entity nodes are clustered in a hierarchy by considering their own similarities or based on an expert ontology. Given the n-level cluster hierarchy, each primary entity i is assigned a cluster vector $c_i[1 \ldots n]$ where $c_i[k]$ is a cluster ID number in the k-th level in the hierarchy. Then, $d_{ij}$ is calculated, as follows:

$$d_{ij} = 1 - \frac{\langle c_i, c_j \rangle}{\|c_i\|\|c_j\|} \quad (6)$$

where $\langle c_i, c_j \rangle$ is the inner product between vector $c_i$ and $c_j$; is the L2 norm of the vector c. The exemplary pattern enhancement process 800 enhances outlier patterns during step 820 using the layout closeness metric.

The co-occurrence pattern is enhanced during step 810 by using $sim_{ij}$ to encode the hash pattern opacities of the internal relation links 415 and their related entities. Thus, the entities that have connections on multiple facets are automatically highlighted.

The following equation can be used to adjust the hash pattern opacity for all internal relations between i and j.

$$\text{Opacity}(i,j) = \sqrt{d_{ij} * sim_{ij}} \quad (7)$$

The rationale behind this formulation is that the links that connect nodes topologically far away ($d_{ij}$ is large) that are semantically similar ($sim_{ij}$ is large) can be highlighted. In an exemplary implementation, both $sim_{ij}$ and $d_{ij}$ are normalized to the range [0, 1].

The opacity calculated above is rendered by alpha-blending, i.e., a link or node with high opacity is rendered with low transparency. In this manner, it provides a soft-cut with the display context and visually illustrates the patterns in a smooth way.

D. Dynamic Context Switch

Figure 9:
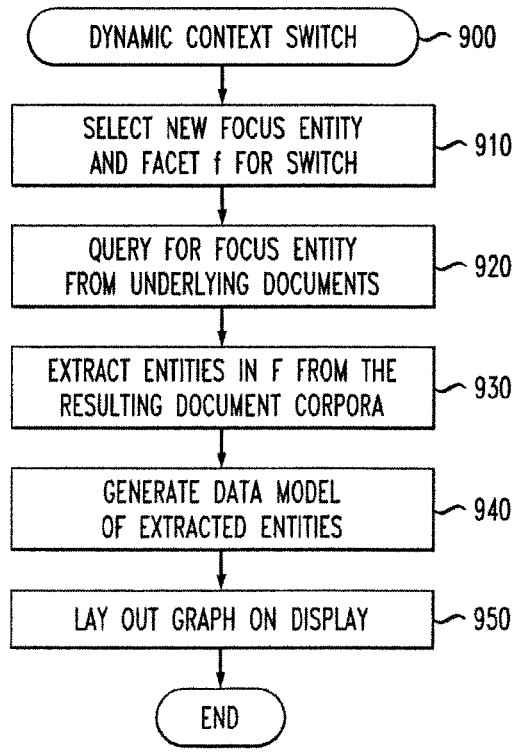
FIG. 9 is a flow chart describing an exemplary implementaiton of a dynamic context switch process that incorporates aspects of the present invention.

FIG. 9 is a flow chart describing an exemplary implementaiton of a dynamic context switch process 900 that incorporates aspects of the present invention. Generally, the dynamic context switch process 900 allows users to pivot the primary visualization layout arrangement across different facets 120 while maintaining his or her analytic focus.

As shown in FIG. 9, the exemplary dynamic context switch process 900 initially selects the focus entity and the facet f that is going to be switched to, during step 910. The exemplary dynamic context switch process 900 then queries for the focus entity from the underlying documents during step 920. During step 930, the exemplary dynamic context switch process 900 extracts entities in F from the resulting document corpora.

The data model of the extracted entities is generated during step 940. Finally, the exemplary dynamic context switch process 900 lays out the graph on the display during step 950.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 10:
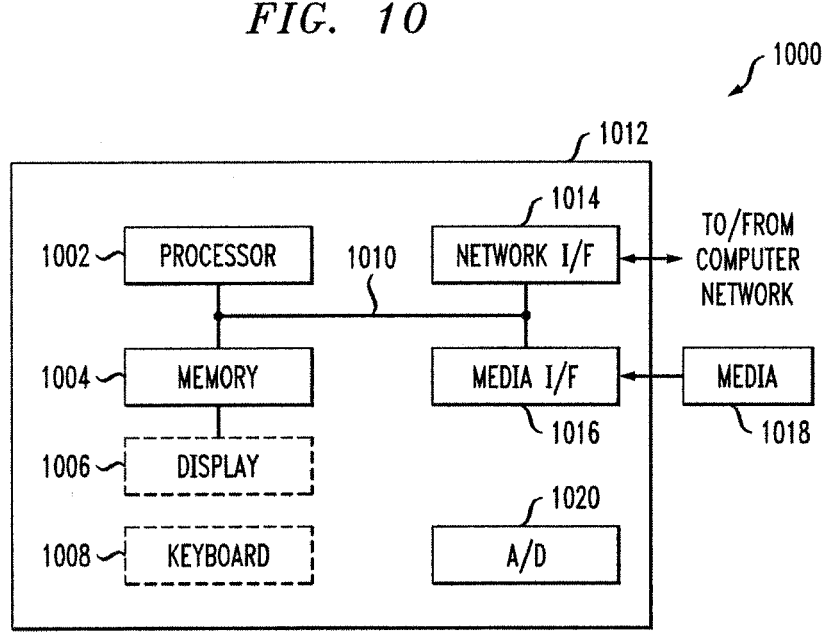
FIG. 10 depicts a computer system that may be useful in implementing one or more aspects and/or elements of the present invention.

One or more embodiments can make use of software running on a general purpose computer or workstation. FIG. 10 depicts a computer system 1000 that may be useful in implementing one or more aspects and/or elements of the present invention. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Analog-to-digital converter(s) 1020 may be provided to receive analog input, such as analog video feed, and to digitize same. Such converter(s) may be interconnected with system bus 1010.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1018 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 1002. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for visualizing a data set, said data set comprising a plurality of entities, facets and relations, said method comprising:
    generating, using at least one processing device, a visualization of a plurality of said facets in said data set, wherein said visualization indicates connections along said plurality of said facets in a single view using multi-faceted edges, wherein said entities are instances of a particular concept, said facets are classes of entities and said relations are connections between pairs of said entities, wherein said relations comprise one or more internal relations that are connections between entities within a same facet and one or more external relations that are connections between entities of different facets;
    rotating, using at least one processing device, one or more compound nodes to one or more of reduce an average length of one or more of said edges and allow edge bundling; and
    updating, using at least one processing device, said visualization based on said rotating.

2. The method of claim 1, wherein said internal relations are represented as edges connecting two facet nodes from different compound nodes and wherein said method further comprises the step of reducing a number of crossings of said edges by adjusting a position order of facet nodes.

3. An apparatus for visualizing a data set, said data set comprising a plurality of entities, facets and relations, said apparatus comprising:
    a memory; and
    at least one processing device, coupled to the memory, operative to:
    generate, using at least one processing device, a visualization of a plurality of said facets in said data set, wherein said visualization indicates connections along said plurality of said facets in a single view using multi-faceted edges, wherein said entities are instances of a particular concept, said facets are classes of entities and said relations are connections between pairs of said entities, wherein said relations comprise one or more internal relations that are connections between entities within a same facet and one or more external relations that are connections between entities of different facets;
    rotate, using at least one processing device, one or more compound nodes to one or more of reduce an average length of one or more of said edges and allow edge bundling; and
    update, using at least one processing device, said visualization based on said rotating.

4. The apparatus of claim 3, wherein said internal relations are represented as edges connecting two facet nodes from different compound nodes and wherein said processor is further configured to reduce a number of crossings of said edges by adjusting a position order of facet nodes.

5. The apparatus of claim 3, wherein said visualization employs a visual encoding to distinguish said entities, facets and relations.

6. An article of manufacture for visualizing a data set, said data set comprising a plurality of entities, facets and relations, comprising a non-transitory machine readable recordable storage medium containing one or more programs which when executed implement the step of:
    generating, using at least one processing device, a visualization of a plurality of said facets in said data set, wherein said visualization indicates connections along said plurality of said facets in a single view using multi-faceted edges, wherein said entities are instances of a particular concept, said facets are classes of entities and said relations are connections between pairs of said entities, wherein said relations comprise one or more internal relations that are connections between entities within a same facet and one or more external relations that are connections between entities of different facets;
    rotating, using at least one processing device, one or more compound nodes to one or more of reduce an average length of one or more of said edges and allow edge bundling; and
    updating, using at least one processing device, said visualization based on said rotating.

7. The article of manufacture of claim 6, wherein each facet is represented as a separate layer in a data model and is identified by a distinct pattern.

8. The article of manufacture of claim 6, wherein said visualization indicates a global relation using a density map and a multi-faceted graph and indicates a local relation using one or more compound nodes.

9. The article of manufacture of claim 8, wherein said compound node comprises a representation of a primary entity, surrounded by representations of one or more secondary entities connected by one or more external relations.

10. The article of manufacture of claim 6, wherein said internal relations are represented as edges connecting two facet nodes from different compound nodes and wherein said article of manufacture further comprises the step of reducing a number of crossings of said edges by adjusting a position order of facet nodes.

11. The article of manufacture of claim 6, further comprising the step of transforming said data set into a multi-facet entity relational data model.

12. The article of manufacture of claim 6, further comprising the steps of receiving a text query and providing a depiction in said visualization of one or more facets, entities, relations and clusters that are relevant to said query.

13. The article of manufacture of claim 6, wherein said visualization employs a visual encoding to distinguish said entities, facets and relations.

14. The article of manufacture of claim 13, wherein said visual encoding distinguishes one or more of said entities, facets and relations using one or more patterns.

15. The article of manufacture of claim 13, wherein said visual encoding distinguishes one or more of said entities, facets and relations using one or more density maps.

16. The article of manufacture of claim 6, wherein said visualization provides a dynamic context control to perform a context switch between different facets of information.

17. The article of manufacture of claim 6, wherein said visualization represents a co-occurrence pattern using parallel links between associated entities.

18. The article of manufacture of claim 6, wherein said visualization represents one or more outlier patterns that represent entities with internal relations crossing cluster boundaries by highlighting links across the cluster boundaries using an opacity adjustment.

* * * * *